United States Patent
Walker et al.

(10) Patent No.: US 9,897,706 B2
(45) Date of Patent: *Feb. 20, 2018

(54) MATERIALS, METHOD, AND APPARATUS FOR DETECTING NEUTRONS AND IONIZING RADIATION

(71) Applicant: NANOPTICS, INCORPORATED, Gainesville, FL (US)

(72) Inventors: James K. Walker, Gainesville, FL (US); Richard T. Farley, Gainesville, FL (US); Youngwook Noh, Gainesville, FL (US)

(73) Assignee: NANOPTICS, INCORPORATED, Gainesville, FL (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/674,795

(22) Filed: Mar. 31, 2015

(65) Prior Publication Data

US 2015/0241573 A1    Aug. 27, 2015

Related U.S. Application Data

(63) Continuation of application No. 13/430,394, filed on Mar. 26, 2012, now Pat. No. 8,993,968.

(Continued)

(51) Int. Cl.
  *G01T 1/203* (2006.01)
  *G01T 3/06* (2006.01)
  (Continued)

(52) U.S. Cl.
  CPC ............. *G01T 1/2033* (2013.01); *C09K 9/02* (2013.01); *C09K 11/06* (2013.01); *G01T 1/203* (2013.01);
  (Continued)

(58) Field of Classification Search
  CPC ......... G01T 1/2033; G01T 1/203; G01T 3/06; C09K 9/02; C09K 11/06
  See application file for complete search history.

(56) References Cited

U.S. PATENT DOCUMENTS

| 3,010,908 A | 11/1961 | Broderick et al. |
| 3,960,756 A | 6/1976 | Noakes |

(Continued)

FOREIGN PATENT DOCUMENTS

| EP | 0 606 732 | 7/1994 |
| WO | WO 2012/142365 A2 | 10/2012 |
| WO | WO 2013/003802 A1 | 1/2013 |

OTHER PUBLICATIONS

Benniston, A.C., et al., "Intramolecular Excimer Formation and Delayed Fluorescence in Sterically Contrained Pyrene Dimers," *Chemistry: A European Journal*, May 2007, 13(16):4665-4674.

(Continued)

*Primary Examiner* — David Porta
*Assistant Examiner* — Mindy Vu
(74) *Attorney, Agent, or Firm* — Saliwanchik, Lloyd & Eisenschenk

(57) ABSTRACT

Embodiments include a scintillator material, a scintillator system, and/or a method of detecting incident radiation using a scintillator material, or scintillator system, comprising a polymer material that comprises chromophores. Additional embodiments provide a scintillator material, scintillator system, and/or a method of detecting incident radiation using a sctintillator material, or scintillator system, comprising a polymer material having one, two, three, or more, organic dyes dissolved therein wherein the polymer material having the one, two, three, or more dyes dissolved therein comprises chromophores. At least one of the dyes, termed the base dye, has a concentration in the range 0.5 to 3.5 mol/L. In an embodiment, the base dye has a concentration (Continued)

in the range 1.0 to 3.0 mol/L. This base dye concentration is high enough to achieve a substantial triplet-triplet state annihilation rate despite the negligible diffusion of the dye in the rigid polymer matrix.

20 Claims, 5 Drawing Sheets

Related U.S. Application Data

(60) Provisional application No. 61/467,613, filed on Mar. 25, 2011, provisional application No. 61/482,485, filed on May 4, 2011.

(51) Int. Cl.
  *C09K 9/02* (2006.01)
  *C09K 11/06* (2006.01)

(52) U.S. Cl.
  CPC .......... *G01T 3/06* (2013.01); *C09K 2211/10* (2013.01); *C09K 2211/1007* (2013.01); *C09K 2211/1011* (2013.01); *C09K 2211/1029* (2013.01); *C09K 2211/1088* (2013.01)

(56) References Cited

U.S. PATENT DOCUMENTS

| | | | |
|---|---|---|---|
| 4,495,084 A | 1/1985 | Shimizu et al. | |
| 4,594,179 A | 6/1986 | Harrah et al. | |
| 5,298,189 A | 3/1994 | Kauffman | |
| 5,606,638 A | 2/1997 | Tymianski et al. | |
| 7,525,100 B2 | 4/2009 | Kraemer et al. | |
| 7,985,868 B1 | 7/2011 | Bauer et al. | |
| 8,993,968 B2* | 3/2015 | Walker | 250/361 R |
| 9,360,567 B2* | 6/2016 | Noh | G01T 3/06 |
| 2005/0135535 A1 | 6/2005 | Wallace | |
| 2006/0148986 A1 | 7/2006 | Glasgow et al. | |
| 2010/0226580 A1 | 9/2010 | Frank | |
| 2010/0256923 A1 | 10/2010 | Payne et al. | |
| 2011/0108738 A1 | 5/2011 | Doty et al. | |
| 2012/0199747 A1* | 8/2012 | Letant | B82Y 15/00 250/362 |
| 2016/0154122 A1* | 6/2016 | Noh | G01T 1/2018 250/362 |

OTHER PUBLICATIONS

Birks, J.B., "The Luminescence of Liquid Alkyl Benzenes Under High-Intensity Ionizing Irradiation," *Chemical Physics Letters*, Feb. 1970, 4(10):603-606.

Birks, J.B., *The Theory and Practice of Scintillation Counting*, Pergamon Press, 1964.

Bohne, C., et al., "Characterization of the Triplet-Triplet Annihilation Process of Pyrene and Several Derivatives under Laser Excitation," *Journal of the American Chemical Society*, May 1990, 112(11):4226-4231.

Brooks, F.D., et al., "Pulse Shape Discrimination in a Plastic Scintillator," *IRE Transactions on Nuclear Science*, 1960, (7):2-3, 35-38.

D'Ambrosio, C., et al., "Particle Tracking with Scintillating Fibers," *IEEE Transactions on Nuclear Science*, Jun. 1996, 43(3):2115-2127.

De Vries, T.S., et al., "Lithium Phenolates Solvated by Tetrahydrofuran and 1,2-Dimethoxyethane: Structure Determination Using the Method of Continuous Variation," *Journal of the American Chemical Society*, Sep. 2009, 131(36):13142-13154.

Delaunay, "Neutron Detector Developments at LPC Caen," http://www.slidefinder.net/d/delaunay/delaunay/13688226.

Flaska, M., et al., "Digital Pulse Shape Analysis for the Capture-Gated Liquid Scintillator BC-523A," *Nuclear Instruments and Methods in Physics Research A*, Feb. 2009, (599)2-3:221-225.

Güsten, H., et al., "Organic Scintillators with Unusually Large Stokes' Shifts," *Journal of Physical Chemistry*, Feb. 1978, 82(4):459-463.

Güsten, H., et al., "Photophysical Properties of Fluoranthene and Its Benzo Analogues," *Journal of Photochemistry*, 1982, 18(1):9-17.

Hull, G., et al., "New Organic Crystals for Pulse Shape Discrimination," *IEEE Transactions on Nuclear Science*, Jun. 2009, 56(3):899-903.

Knoll, G.F., *Radiation Detection and Measurement*, J. Wiley and Sons, 1998.

McKinsey, D.N., et al., "Fluorescence Efficiencies of Thin Scintillating Films in the Extreme Ultraviolet Spectral Region," *Nuclear Instruments and Methods in Physics Research B*, Nov. 1997, 132(3):351-550.

Newhouse, E. I. "Fractal-Like Energy Transport and Fusion in a Naphthalene-Doped Polymeric Glass" *Journal of Luminescence*, 1984, 31 & 32:651-653.

Office Action dated Jul. 31, 2014, in U.S. Appl. No. 14/055,765.

Runkle, R.C., et al., "Securing special nuclear material: Recent advances in neutron detection and their role in nonproliferation," *Journal of Applied Physics*, 2010, 108:Article No. 111101.

Turro, N.J., et al., *Modem Molecular Photochemistry of Organic Molecules*, University Science Books, 2010.

Venditto, V. et al. "Orientation and Microenvironment of Naphthalene Guest in the Host Nanoporous Phase of Syndiotactic Polystyrene," *Macromolecules*, 2005, 38:3696-3702.

Zaitseva, N., et al., "Plastic scintillators with efficient neutron/gamma pulse shape discrimination," *Nuclear Instruments and Methods in Physics Research A*, Mar. 2012, 668:88-93.

\* cited by examiner

MATERIALS, METHOD, AND APPARATUS FOR DETECTING NEUTRONS AND IONIZING RADIATION

CROSS-REFERENCE SECTION

The present application is a continuation of U.S. application Ser. No. 13/430,394, filed Mar. 26, 2012, which claims the benefit of U.S. Provisional Application Ser. No. 61/467,613, filed Mar. 25, 2011, and U.S. Provisional Application Ser. No. 61/482,485, filed May 4, 2011, all of which are hereby incorporated by reference herein in their entirety, including any figures, tables, or drawings.

TECHNICAL FIELD

Embodiments of the invention relate to polymeric scintillator materials utilized in the detection of radiation. Specific embodiments pertain to polymeric scintillators employed to detect ionizing radiation. Further specific embodiments include a polymeric scintillator material that exhibits pulse shape discrimination for detecting fast and thermal neutrons in the presence of a high gamma ray background.

BACKGROUND OF INVENTION

Ionizing radiation energy deposited in a scintillator material is converted into light. This light can then be measured by photo-sensitive detectors. Generally, incident penetrating radiation includes high-energy particles and ionizing radiation such as x-rays, gamma rays, alpha and beta particles, and/or fast and thermal neutrons. Plastics can be used as a scintillator material. Plastic scintillators can be used, for example, to detect the presence of ionizing radiation from illegal transport of radioactive and fissile material, in monitoring and safeguarding nuclear stockpiles, in service of nuclear nonproliferation, in the operation of nuclear research and power reactors, in monitoring the use of medical and industrial isotopes, and in high energy, cosmic, and nuclear basic research.

In all of these applications, there has been a long term need for increasing the efficiency and discrimination of detecting neutrons in the presence of background gamma rays. The detection of neutrons is important because they are strongly indicative of the presence of fissile material, such as plutonium and enriched uranium.

Gas proportional tubes have been used extensively to detect thermal neutrons with good discrimination against gamma rays. However, these tubes suffer from some disadvantages, including inability to detect fast neutrons, sensitivity to mechanical vibration and shock, poor timing resolution, and high cost per unit area. Some of the above disadvantages are also present with respect to another neutron detection technology, namely, lithium loaded zinc sulphide screens read out by plastic optical wavelength shifting fibers.

Organic liquid scintillators have been employed to detect fast neutrons, partly because their high hydrogen content allows neutron detection via proton recoil (G. F. Knoll, "Radiation Detection and Measurement", J. Wiley and Sons, 1998). For these detectors, the discrimination of the neutrons over gamma rays is achieved with the use of pulse shape discrimination (PSD). With PSD, the gamma ray and neutron scintillation pulses are distinguished by the unique temporal signal characteristics of neutrons. However, the discrimination against gamma-rays is less than desired in a high background of gamma-rays. A recent review of progress in PSD in liquid scintillators has demonstrated that the technique has become very powerful in commercially available liquid scintillators; see Mark Flaska and Sara A. Pozzi, Nuclear Instruments and Methods in Physics Research, Vol. 599, Issue 2-3, 221-225 (2009). In particular, they have shown that scintillation pulses produced by nuclear fragments resulting from thermal neutron capture by $^{10}B$ have shapes that can be distinguished from both neutron scattering pulses and from gamma ray interactions. This permits the detection of a neutron scatter followed by the neutron being captured in the same detector. This so called "capture-gated" detector provides measurement of the energy spectrum of fast neutrons followed by neutron capture identification and excellent gamma rejection. At present, a few liquid organic scintillators featuring the PSD enabling property are commercially available for neutron detection (e.g., from Bicron Corp. and Eljen Technology). However, there are safety concerns in using large volumes of toxic, flammable, aromatic liquids at port and border locations having high commercial activity and/or utilizing large moving trucks. For these reasons liquid scintillators have not been deployed at these locations.

Among solid organic materials, single crystals of Stilbene and some other crystalline dyes have been found to exhibit comparably effective PSD as liquid scintillators (Hull et al. IEEE Transactions on Nuclear Science, Vol. 56, No. 3., 899-903.). The difficulty of growing large crystals makes it unlikely they will be used in anything other than hand-held detectors.

There have been advancements in the last decade in the development of ultrafast waveform digitizers (e.g., from Agilent Technologies), which have enabled commercial detectors featuring PSD.

In some of the above applications, the shipping container hiding the fissile material is exposed to an external beam of gamma rays or neutrons. Known as active interrogation, this process creates a relatively high radiation exposure to the container and its surroundings. In this case, the scintillator that offers PSD is required to operate in a high radiation environment with very high gamma discrimination.

In summary, there is a continuing need to have large area, cost effective, robust plastic scintillator material, method, and apparatus, offering fast and thermal neutron detection by PSD, excellent gamma discrimination, good radiation resistance, and good timing information.

BRIEF SUMMARY

Features and advantages of embodiments of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Embodiments of the invention can be, or utilize, a scintillation material, or composition, or a method utilizing a scintillation material for converting incident radiation to scintillation light wherein the scintillator composition comprises:

a matrix material with a plurality of base fluorescent dye molecules dissolved therein, wherein the matrix material is a solid organic material, wherein the matrix material with the plurality of base fluorescent dye molecules dissolved therein comprises a plurality of chromophores, wherein the plurality of chromophores have a chromophore average nearest neighbor distance in the range 0.5 to 12 Angstroms;

wherein the plurality of chromophores produces the scintillation light upon excitation;

wherein the scintillation light has a prompt time component and a delayed time component, wherein the prompt time component and the delayed time component provide information so as to allow distinguishing between scintillation light created by neutrons and scintillation light created by gamma rays.

The plurality of base fluorescent dye molecules can comprise a plurality of base fluorescent dye chromophores, wherein each base fluorescent dye molecule comprises one or more base fluorescent dye chromophores of the plurality of base fluorescent dye chromophores, wherein the plurality of chromophores comprises the plurality of base fluorescent dye chromophores, wherein the plurality of base fluorescent dye chromophores have a base fluorescent dye chromophore average nearest neighbor distance in the range 0.5 to 12 Angstroms.

In an embodiment, wherein the plurality of chromophores comprises a plurality of matrix material chromophores, wherein the matrix material chromophores have a matrix material chromophore average nearest neighbor distance in the range 0.5 to 12 Angstroms.

The prompt time component has a prompt intensity ($I_P$) and a prompt time constant ($T_P$), and the delayed time component has a delayed intensity ($I_D$) and a delayed time constant ($T_D$), where $I_P$, $T_P$, $I_D$, and $T_D$ are such that a difference between a mean of a gamma ray scintillation signal due to gamma rays incident on the scintillation system and a mean of a neutron scintillation signal due to neutrons incident on the scintillation system divided by a sum of a FWHM of the gamma ray scintillation signal and a FWHM of the neutron scintillation signal is at least 1.5, at least 2, at least 3, in the range 1.5 to 2, in the range 1.5 to 3.

Embodiments of the invention provide a scintillator comprising a polymer material having one, two, or more, organic dyes dissolved therein. At least one of the dyes, termed the base dye, has a concentration in the range 0.5 to 3.5 mol/L. In a specific embodiment, the base dye has a concentration in the range 1.0 to 3.0 mol/L. This base dye concentration is high enough to achieve a substantial triplet-triplet state annihilation rate despite the negligible diffusion of the dye in the rigid polymer matrix. The rate of triplet-triplet annihilation determines the delayed scintillation time constant. Embodiments of the invention utilize a theoretical model based on Direct Energy Transfer via Electron Exchange (DETEE) between triplet states, which relates base dye concentration to the time constant for delayed scintillation light. The model can be used to aid the design of the material composition of the solid polymeric scintillator. The ability to control the decay time constant of the scintillation light used for PSD is a major advantage of the material composition of specific embodiments of the invention, as compared to the traditional diffusion limited fixed time constant of an organic liquid scintillator.

For tracks with high ionization density along their length, a greater fraction of adjacent triplet states is formed. The annihilation process leads to delayed fluorescence. The combination of prompt and delayed fluorescence provides the PSD. The base dye is selected to have large quantum yield, and can have alkyl substituents, if necessary, to provide increased solubility and quench resistance.

A specific embodiment of the invention is a plastic scintillator incorporating one dye, which is a base dye. The base dye has a large Stokes shift and emits excimer scintillation light having a wavelength >400 nm.

A further embodiment of the invention is a plastic scintillator incorporating two dyes, one of which is a base dye. The base dye preferably emits scintillation light having a wavelength >400 nm. The second, or primary, dye has a concentration in the range 0.0005 to 0.005 mol/L and shifts the wavelength of the light from the base dye further into the visible range. In specific embodiments, the primary dye has a concentration <0.02% wt/wt.

A still further embodiment of the invention is a plastic scintillator incorporating three dyes, one of which is a base dye. The second, or primary, dye has a concentration in the range 0.05 to 0.15 mol/L and preferably emits light having a wavelength <400 nm. The third dye, or secondary dye, has a concentration in the range 0.0005 to 0.005 mol/L and preferably emits light having a wavelength >400 nm. In specific embodiments, the primary dye has a concentration in the range 0.3 to 2% wt/wt and the secondary dye has a concentration <0.02% wt/wt.

An even further embodiment is a plastic scintillator incorporating four dyes, a base dye, a primary dye, a secondary dye, and a tertiary dye.

The scintillating polymer can have a substantially increased prompt scintillation light output, such as by a factor of at least 1.5 and, in certain circumstances, by a factor of more than 2 times that of existing plastic scintillators. Embodiments of the scintillating plastic have a prompt fluorescence lifetime ranging from a few nanoseconds to a few tens of nanoseconds. The selection of the base dye is important to the development of efficient PSD. Embodiments can utilize base dyes having one or more of the following criteria: very high solubility for the dye; high quantum yield and Stokes shift for decay from the first excited singlet state, S1, and several specific properties for the first excited triplet state, T1. A variety of dyes can be used as the primary and secondary dyes. In the above three embodiments, the scintillating plastics exhibit enabling properties for PSD comparable to a liquid scintillator.

The embodiment having one dye, where the base dye has a large Stokes shift and emitting excimer scintillation light having a wavelength >400 nm, and the embodiment incorporating two dyes, the base dye emitting scintillation light having a wavelength >400 nm and a second dye shifting the wavelength of the light from the base dye further into the visible range, provide a highly radiation resistant plastic scintillator that provides PSD information. In these scintillators, light propagation is designed to occur at wavelengths longer than 400 nm. Because radiation damage to a plastic scintillator produces increased optical absorption at wavelengths less than 400 nm, there is little loss of scintillation light in the material compositions of these two embodiments of the invention.

In another embodiment of the invention, a single dye is dissolved at a low to moderate concentration in the plastic. This single dye contains two or more chromophores that are held at an optimal distance from each other to create a desirable time constant of the delayed scintillation light. Excimer emission occurs in the form of prompt and delayed fluorescence. The large Stokes shift associated with excimer emission provides good transmission through the plastic scintillator. The combination of prompt and delayed fluorescence light provides PSD information.

In another embodiment of the invention, an organometallic compound, or inorganic metallic salt, containing an element with large neutron capture cross-section is dissolved in the plastic scintillator. A preferred metal is $^6$Li, whose ions can be dissolved at a concentration of about 0.06% wt/wt in the polymeric scintillator. This lithium concentration provides an intrinsic detection efficiency of greater than 40% for thermal neutrons incident on a 3 inch thick plastic scintillator. This intrinsic efficiency, >50%, may be compared to the 15% intrinsic efficiency of currently deployed $^3$He tubes in Radiation Portal Monitors (see R. M. Van Ginhoven et al. PIET-43741-TM840, PNNL-18471 Page 5). Other metals can be dissolved in the scintillator, where the metal isotope has a large thermal neutron capture cross-section and produces energetic nuclear fragments or gamma rays when a neutron capture occurs, such as $^6$Li, $^{11}$B, and $^{157}$Gd.

In a further embodiment of the invention, the plastic scintillator is fabricated to have little oxygen dissolved therein. In a specific embodiment, the concentration of oxygen dissolved in the plastic scintillator is less than $10^{-4}$ wt/wt, and in another embodiment less than $10^{-5}$ wt/wt.

In another embodiment of the invention, the plastic scintillator is cross-linked.

Embodiments of the invention pertain to a scintillating polymeric material that enables efficient PSD and operates reliably in a high radiation field. The plastic can be used to detect fast and thermal neutrons independently of one another. In addition, a fast neutron can be detected, moderated, and detected as a thermal neutron in the capture-gated mode. This new scintillating material composition provides high detection efficiency, while providing excellent gamma rejection for active interrogation.

In embodiments of the invention, the subject scintillator material can be used for passive and active detection of fissile material.

DETAILED DISCLOSURE

Figure 1:
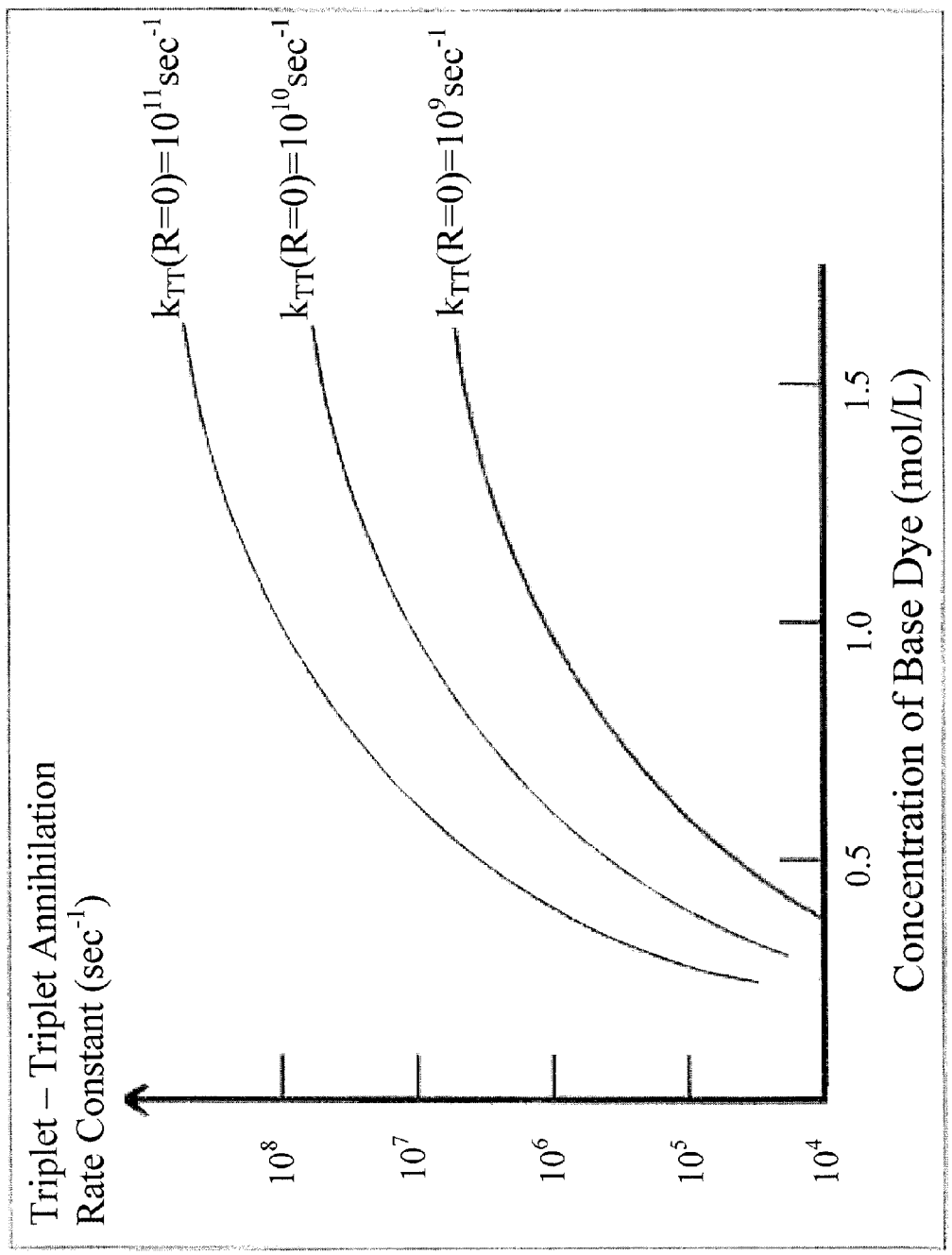
FIG. 1 shows the predicted triplet-triplet annihilation (TTA) rate constant plotted versus the base dye concentration in the plastic predicted by a theoretical model based on the mechanism of Direct Energy Transfer via Electron Exchange (DETEE), where the normalization of the curve is set by assuming the rate constant to be $10^9$ sec$^{-1}$, $10^{10}$ sec$^{-1}$, and $10^{11}$ sec$^{-1}$ at "classical" contact (R=0) of the two triplet state molecules.

Embodiments of the invention provide a scintillator material, a scintillator system, and/or a method of detecting incident radiation using a scintillator material, or scintillator system, comprising a polymer material that comprises chromophores. Additional embodiments provide a scintillator material, scintillator system, and/or a method of detecting incident radiation using a scintillator material, or scintillator system, comprising a polymer material having one, two, three, or more, organic dyes dissolved therein wherein the polymer material having the one, two, three, or more dyes dissolved therein comprises chromophores. At least one of the dyes, termed the base dye, has a concentration in the range 0.5 to 3.5 mol/L. In a specific embodiment, the base dye has a concentration in the range 1.0 to 3.0 mol/L. This base dye concentration is high enough to achieve a substantial triplet-triplet state annihilation rate despite the negligible diffusion of the dye in the rigid polymer matrix. The rate of triplet-triplet annihilation determines the delayed scintillation time constant. Embodiments of the invention utilize a theoretical model based on Direct Energy Transfer via Electron Exchange (DETEE) between triplet states, which relates base dye concentration to the time constant for delayed scintillation light. The model can be used to aid the design of the material composition of the solid polymeric scintillator. The ability to control the decay time constant of the scintillation light used for PSD is a major advantage of the material composition of specific embodiments of the invention, as compared to the traditional diffusion limited fixed time constant of an organic liquid scintillator.

The book "The Theory and Practice of Scintillation Counting", by J. B. Birks, 1964, which is incorporated herein by reference, discusses scintillation counting, and teaches plastic solvents and scintillator materials that can be utilized in accordance with embodiments of the subject invention. Polyvinyl benzene (polystyrene, PS), and polyvinyl toluene (PVT) are suitable low cost plastic solvents that can be utilized in specific embodiments of the subject scintillator, and have been used for commercial production of scintillator material. Other transparent polymers that can be used include, but are not limited to polyvinylxylene, polyvinylnaphthalene, polyvinylbiphenyl, polyvinylcarbazole and polyvinylcarbonate. In addition, polymethylmethacrylate is another suitable polymer for making plastic scintillator in accordance with embodiments of the invention. Other suitable polymers include poly(methylacrylate) (PMA) and polycarbonate. Although polymethylmethacrylate does not generate light within the polymer matrix, this is not a major issue when high concentrations of base dyes are employed.

Ionizing radiation in a plastic scintillator produces mostly free electrons and ions. Recombination is very rapid and excited aromatic compounds are produced. About 25% of these molecules are left in the lowest excited singlet state, S1, and 75% in the lowest excited triplet state, T1. Decays of S1 state dye molecules produce prompt fluorescence. Long lived T1 state dye molecules give rise to phosphorescence. However, in liquid scintillator, T1 states can diffuse a few hundred Angstroms in a microsecond and may encounter and annihilate with another T1 state, creating an S1 state that fluoresces: T1+T1→S1+S0. This process is the source of the slow component of fluorescence that permits PSD in liquid scintillator. In plastic scintillator, there is negligible diffusion of dyes. Therefore, to achieve PSD, the concentration of base dye in the plastic are preferably increased until the molecules are in close enough proximity to achieve a desired rate of T1+T1 state self-annihilation. Considering that a minimum ionizing electron loses about 1 eV per 50 Angstrom of path length along the electron track, it is evident that in a liquid or plastic there is a low rate of T1+T1 annihilation events. However, an approximate measure of the relative ionization densities produced by electron/proton/alpha particles is 1/10/100. For this reason, a measure of the magnitude of the slow component of the scintillation pulse can be a powerful identifier of the type of radiation producing light in the plastic scintillator.

A qualitative estimate of the annihilation rate of T1 states in plastic versus base dye concentration has been made by using the Perrin Formulation (Perrin, J., Ann Chem. Phys., 17, 283 (1932)) and by considering an exponential dependence of the rate constant of the Direct Energy Transfer via Electron Exchange (the DETEE process) annihilation mechanism between triplet states (Ermolaev, V. L. Soy. Physics, Doklady, 6, 600 (1967)). That estimate reveals a rapidly increasing annihilation rate of T1 states when the average distance between the peripheries of the T1 states is in the range 1 to several Angstroms. The average distance between T1 states is controlled by the dye concentration. Embodiments of the invention utilize a scintillator material where the average nearest neighbor distance for the chromophores is 0.5 to 12 Angstroms, and preferably 1 to 8 Angstroms. Further embodiments utilize a scintillator material where the average nearest neighbor distance for the chromophores is 0.5 to 1, 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 0.5 to 15, 0.5 to 14, 0.5 to 13, 0.5 to 12, 0.5 to 11, 0.5. to 10, 0.5 to 9, 0.5 to 8, 0.5 to 7, 0.5 to 6, 0.5 to 5, 0.5 to 4. 0.5 to 3, 0.5 to 2, less than 15, less than 14, less than 13, less than 12, less than 11, less than 10, less than 9, less than 8, less than 7, less than 6, less than 5, less than 4, less than 3, less than 2, and/or less than 1 Angstroms.

Figure 5:
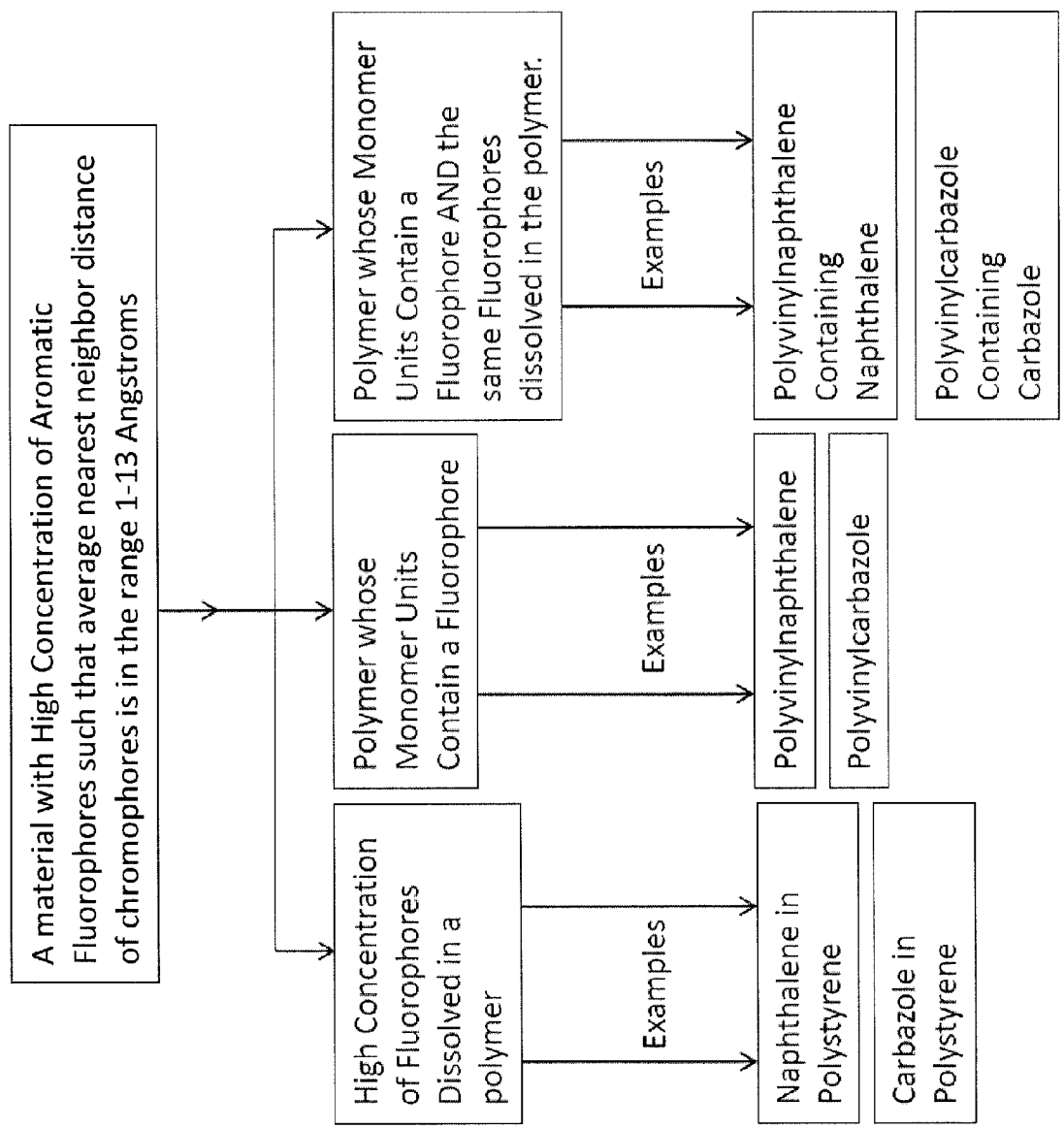
FIG. 5 shows general specifications for constraints of a scintillation composition, or material, containing a high concentration of aromatic fluorophores such that the average nearest neighbor distance of chromophores is in the range 1 to 13 Angstroms, which can be incorporated with specific embodiments.

FIG. 5 shows the general specifications for constituents of a scintillation composition, or material, containing a high concentration of aromatic fluorophores, or chromophores, such that the average nearest neighbor distance of chromophores is in the range 1 to 13 Angstroms, which can be incorporated with specific embodiments of the invention. FIG. 5 shows three qualitatively different material compositions that can achieve the constituent requirements for specific embodiments of the invention.

An embodiment incorporates a high concentration of fluorophores dissolved in a polymer, such as naphthalene dissolved in a polymer such as polystyrene. Another embodiment utilizes a polymer whose monomer units contain a fluorophore, such as polyvinyl naphthalene and polyvinylcarbazole. Another embodiment utilizes a polymer whose monomer unit contains a fluorophore, with a dye containing that same fluorophore dissolved in the polymer. The efficacy of each of the embodiments shown in FIG. 5 depends on the choice of polymers and fluorophores.

FIG. 1 shows the predicted rapidly changing rate constant for triplet-triplet annihilation versus the concentration of the base dye in the plastic based on the estimate. Most candidate base dyes have rate constants within the area bounded by the upper and lower curves. The most important feature of the graph is the rapid increase in the rate constant in the concentration range 0.5 up to 1.0 mol/L. The measured diffusion limited rate constant for delayed scintillation light from a commercial liquid scintillator, NE320 is about 150 nsec. These results show that in a solid polymer, the DETEE mechanism predicts that an appropriately selected base dye concentration can provide a decay constant for delayed scintillation similar to that obtained in diffusion limited liquid scintillators. Most importantly, the decay can be controlled in the plastic.

A typical value of $k_{TT}(R=0)=10^9$ is seen in FIG. 1. This value of $k_{TT}(R=0)$ is the rate constant for energy transfer, when the two T1 state molecules are in the state of a "classical" collision: R=0. It is generally desirable to have the experimental annihilation rate constant in the range $10^6$ to $10^8$, corresponding to delayed scintillation time constants of 10 nanoseconds to 1 microsecond. The selection of an optimum base dye to achieve acceptable PSD requires a dye with the combination of a specific $k_{TT}(R=0)$ and concentration. In most cases, the optimum PSD can be achieved with a base dye concentration of >0.5 mol/L and <3.5 mol/L. Embodiments of the invention can utilize a plastic scintillator material base dye with a concentration >0.5 mol/L and <3.5 mol/L. Despite the crudeness of the above model of triplet-triplet annihilation (TTA), the model provides qualitative guidelines in designing a plastic scintillator material that enables PSD. In accordance with the above discussion, it is possible to identify desirable features of the base dye. Specific embodiments can utilize base dyes with one or more of the features. These include:

1. The concentration of the dye should be in the range 0.5 to 3.5 mol/L
2. Quantum efficiency of the base dye singlet state decay should be as high as possible; >0.2, preferably >0.4, and most preferably >0.6.
3. In some cases, the base dye should have some degree of quench protection. Operationally, this means the chromophore should have small alkyl substituents that act as protective bumpers, preventing the close proximity of a quenching agent. The substituents also increase solubility, and prevent aggregation.
4. The Stokes shift of the base dye should be as large as possible. This ensures minimal reabsorption of fluorescence by the base dye, despite its high concentration.
5. The lowest triplet state of the dye should have a low rate of non-radiative energy loss.

One embodiment of the invention is a plastic scintillator containing one dye. In this case, the Stokes shift is preferably high enough to cause little light reabsorption over the characteristic light transmission distance in the application. Various dyes can be used for this embodiment, such as dyes in the class of polycyclic aromatic compounds, such as Fluoranthene, pyrene and some of their derivatives. Some of these dyes emit excimer scintillation light. These dyes are estimated to have less than 30% self-reabsorption in a distance of 1 meter. Some of their properties are given in Table 1. Specific embodiments incorporate one or more base dyes from Table 1.

TABLE 1

Candidate Base dyes with Large Stokes Shift

| Dye | MW (g/mol) | Singlet QE^ | Peak Wavelength of Emission (nm) | Decay Time (ns) | Solubility in PS" (mol/L) | Known TTA* in PS |
|---|---|---|---|---|---|---|
| Fluoranthene | 202 | 0.35 | 465 | 47 | >1 | Yes |
| 3-Phenyl Fluoranthene | 202 | 0.65 | 475 | 34 | >0.5 | Yes |
| 3-Amino Fluoranthene | 278 | 0.53 | 505 | 11 | — | Yes |
| Benzobfluorene | 226 | 0.53 | 465 | 44 | >0.5 | Yes |
| Pyrene | 202 | >0.25 | 480 (excimer) | 45 | >1 | Yes |
| Pyrene derivatives** | >202 | 0.3-0.88 | >500 | 33-120 | >1 | Yes |

^refers to the first excited state fluorescence quantum yield.
*TTA refers to Triplet Triplet Annihilation.
"Dye solubilities in Polystyrene are concentrations up to which there is no experimental evidence of crystal formation.
**Intramolecular dual Pyrene derivatives are described in Chem. Eur. J. 2007, 13, 4665-4674

Fluoranthene and many of its derivatives are well known as nonalternant aromatic compounds which have anomalies with respect to fluorescence properties. These anomalies include negligible dimer formation at room temperature, large Stokes shift, and relative immunity to concentration and oxygen quenching. Detailed studies (Gusten H. et al., "Photophysical Properties of Fluoranthene and its Benzo Analogues" Journal of Photochemistry, 18 (1982) 9-17 and Gehring M. et al., "Delayed Excimer Fluorescence of Fluoranthene Due to Triplet-Triplet Annihilation: Systematic Study of the Fluorescence from a Weakly Bound Excimer", Zeitsch. Fur Phys. Chem. 215, 3, 343-376 (2001)) have been made of the delayed fluorescence of fluoranthene and several derivatives due to TTA in a solvent.

A 100-micron thick film of polystyrene scintillator was made containing 0.75 mol/L of fluoranthene dye. The absorption and fluorescence peaks were measured to occur at 355 nm and 450 nm respectively. There was essentially no overlap between the two spectra. The time integrated scintillation intensity produced by alpha particles from a $^{210}$Polonium source was measured using an oscilloscope. The scintillation intensity was measured to be 50% higher than the signal from Bicron 404 plastic scintillator. Fluoranthene, and the derivatives shown in Table 1, are considered suitable base dyes, at high concentration, for imparting the PSD property to the plastic scintillator.

The delayed fluorescence of pyrene (see Table 1) and several derivatives has been studied (Bohne C. et al. J. Am. Chem. Soc. 1990, 112, 4226-4231) under pulsed laser excitation. These compounds readily show intense delayed excimer emission originating from triplet-triplet annihilation. These compounds are considered suitable base dyes for use as a single dye that will impart the PSD property to the plastic scintillator.

Figure 2:
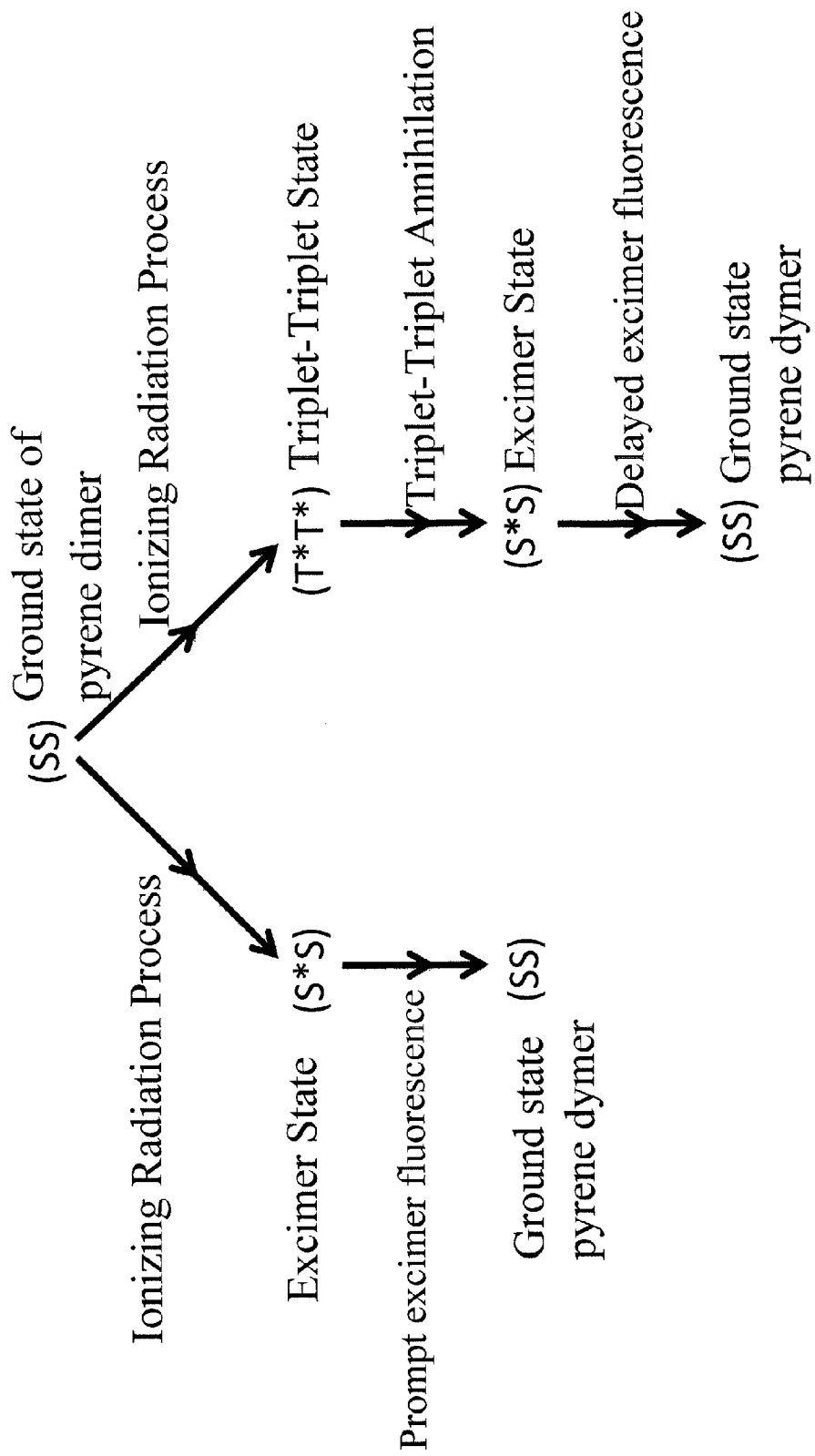
FIG. 2 shows a schematic of the molecular conformations in prompt and delayed fluorescence of pyrene dimers.

Pyrene, at high concentration, is known to fluoresce primarily as an excimer in polystyrene (see U.S. Pat. No. 5,606,638, which is incorporated in its entirety by reference). Dimers, each composed of two pyrene molecules, are self assembled in the monomer solution, and continue to exist as dimers throughout the polymerization process. FIG. 2 shows a schematic of the molecular conformations in prompt and delayed fluorescence of pyrene dimers. A 1 cm-diameter and 1 cm-long polystyrene scintillator was made containing 1.0 mol/L of pyrene dye. The absorption and fluorescence peaks were measured to occur at 336 nm and 480 nm respectively. There was no overlap of the two spectra. The prompt scintillation intensity produced by alpha particles from a Polonium source was measured using an oscilloscope. The intensity was measured to be about 100% higher than that from commercial Bicron 404 plastic scintillator. The scintillation lifetime, defined as the time at which the scintillation intensity has decreased by a factor of 2.7, was measured to be about 65-70 ns. This measured lifetime is a composite of prompt excimer fluorescence with a lifetime of 45 ns and delayed excimer fluorescence resulting from triplet-triplet annihilation as indicated in FIG. 2.

In another embodiment of the invention, two dyes are employed. A base dye at high concentration is used simultaneously with a secondary dye at a very low concentration, in the range 0.0005 to 0.005 mol/L. This embodiment permits the use of the base dyes, such as those in Table 1, in combination with a secondary dye. This combination of dyes allows the transmission of light over 2 or more meters in the plastic with very low attenuation. Secondary dyes preferably have high absorption at the emission peak of the base dye, high quantum yield, and acceptable Stokes shift. There are many dyes that meet these criteria that can be used with embodiments of the invention, such as several members of the coumarin class, e.g., C 519 (2,3,6,7-tetrahydro-11-oxo-1H,5H,11H-[1]benzopyrano[6,7,8-ij]quinolizine-10-carboxylic acid), C 521 (10-acetyl-2,3,6,7-tetrahydro-1H,5H,11H-[1]benzopyrano[6,7,8-ij]quinolizin-11-on), and C 545 (10-(2-benzothiazolyl)-2,3,6,7-tetrahydro-1H,5H,11H-[1]benzopyrano[6,7,8-ij]quinolizin-11-on), and also some members of the rhodamine class of dyes, which emit light in the range 500 to 650 nm, and can be utilized for solid state photo-detectors.

In another embodiment, a total of three dyes are employed. A base dye plus two other dyes, i.e., a primary dye and a secondary dye, are dissolved in a plastic scintillator. In specific embodiments having a total of three dyes, the base dye has a concentration in the range 0.50 to 3.5 mol/L. Base dyes can be selected from the following classes of fluors:
1. Single benzene ring fluors and associated derivatives, such as toluene, xylene and pseudocumene.
2. Two benzene ring fluors which are either fused or in the para-configuration. Examples of some dyes in this class and their derivatives are shown in Table 2. In general, these dyes have adequate solubility and have higher flash points than dyes in the first class.
3. Three benzene ring fluors which are in the para-configuration. Examples of dyes with high quantum efficiencies, very high flash points and acceptable solubilities in this class are: Di-t-Amyl-p-terphenyl, Di-t-Hexyl-p-terphenyl, 2,5-Diphenyloxazole and 2,5-Diphenylfuran.

TABLE 2

Properties of "Two Benzene Ring" Candidate Base Dyes Used in a PSD Plastic Scintillator

| Class of Base Dye | # | Base Dye | CAS# | Molecular Weight | Melting Point ° C. | Quantum Efficiency | Decay Time (ns) | Solubility in Benzene at 300K (Mol. Fraction) | Approximate Range of Dye Fl. Emission 50%-50% (nm) | Compatible Polymer * |
|---|---|---|---|---|---|---|---|---|---|---|
| Naphthalenes | 1 | Naphthalene | 91-20-5 | 128 | 80.5 | 0.23 | 96 | 0.29 | 320-340 | PS |
| | 2 | Diisopropyl-naphthalene (mixture of isomers) | 24157-81-1 | 212 | −40 | ~0.02 | | >0.29 | 320-340 | PS |
| | 3 | Acenapthene | 83-32-9 | 154 | 95 | 0.6 | 46 | 0.17 | 320-340 | PS |
| Biphenyls | 1 | Biphenyl | 92-52-4 | 154 | 69 | 0.18 | 2.3 | 0.39 | 300-330 | PVT |
| | 2 | Fluorene | 86-73-7 | 166 | 115 | 0.8 | 10 | 0.13 | 300-320 | PVT |
| | 3 | 1-methylfluorene | 1730-37-6 | 181 | — | 0.58 | 9.2 | — | 300-320 | |
| | 4 | Diisopropyl fluorene | | 96 | 96 | 0.56 | 9.2 | | | PVT |
| | 5 | Dibenzofluran | 132-64-9 | 168 | 86 | 0.53 | 7.3 | 0.26 | 300-330 | PVT |

* Polyrene (PS) fluorescence spectrum intensity is ≥50% of max in the range 310-360 nm. Polyvinyftoluene (PVT) fluoresces in the range 300-320 nm.

Dyes having chromophores, such as naphthalene and biphenyl, may be employed in embodiments having a base dye and primary and secondary dyes. In addition, compounds based on naphthalene and biphenyl in which there is bridging between the two rings can be used. Such compounds include dihydrophenanthrene and carbazole. The quantum efficiencies of fluorophores in the naphthalene class lie between 0.23 and 0.6, while quantum efficiencies of fluorophores in the biphenyl class lie in the range 0.18 to 0.8, as shown in Table 2. Despite the fact that the naphthalene compounds have a relatively small Stokes shift and relatively high fluorescence reabsorption, the use of a primary dye at a moderate concentration, such as 0.02 to 0.08 mol/L, ensures reasonable efficiency of Forster energy transfer from the base dye to the primary dye. It may be noted from Table 2 that naphthalene compounds emit at a peak fluorescence wavelength of 320 to 340 nm, similar to polystyrene. Therefore, the selection of a primary dye with a peak absorption in that wavelength range is beneficial. Similar remarks can be made for use of biphenyl compounds in polyvinyltoluene. In essence, primary and secondary dyes traditionally selected for use in these two standard polymeric scintillators are also optimal for use in embodiments of plastic scintillators in accordance with the present invention.

Figure 3:
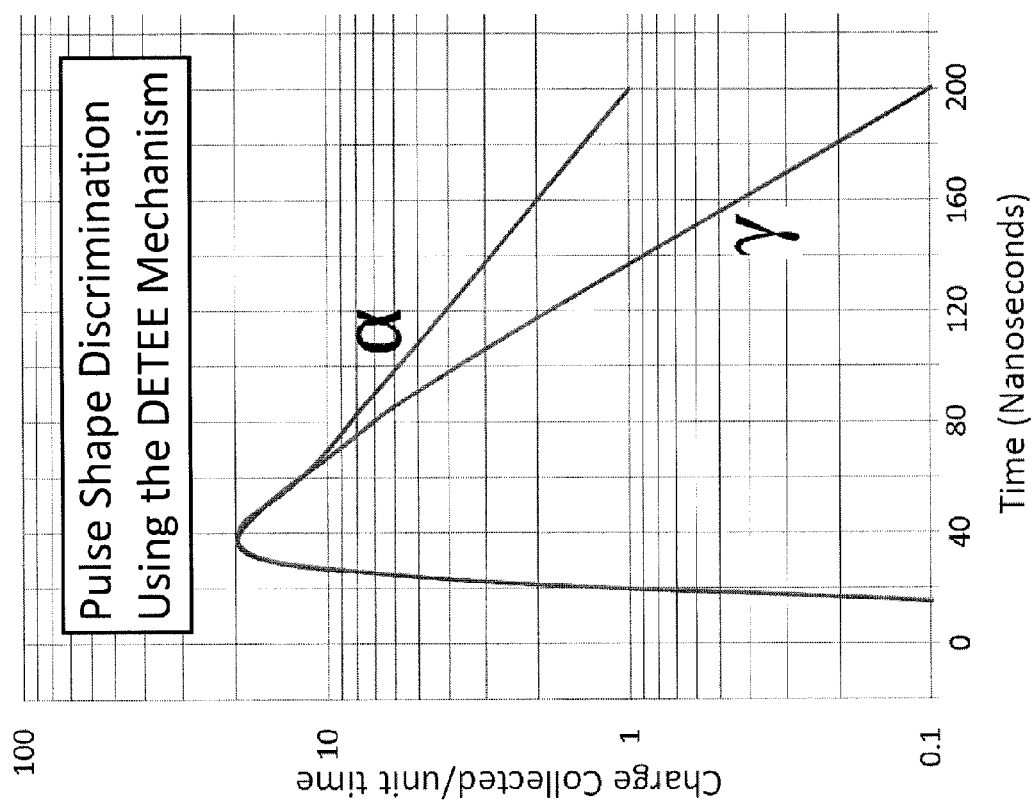
FIG. 3 shows the measured time dependence of scintillation pulses from an alpha particle and a gamma-ray interaction in a solid plastic scintillator, with Diisopropyl naphthalene as the base dye.

An embodiment of the invention incorporating three dyes was made as follows. A 2 cm diameter and 1 cm thick disk of scintillating polystyrene was made to demonstrate the creation of PSD resulting from an appropriate combination of ingredients in the plastic. The sample contained 15% wt/wt of a base dye, diisopropyl naphthalene, 1% wt/wt of p-TerPhenyl (PTP) and 0.02% wt/wt of POPOP. The pulse shape analysis was performed with an Agilent 12-bit, 500 MHz digitizer, Model DP310. Two radioactive sources were used by placing them sequentially on top of the sample, which was optically coupled to a PMT. Data was recorded with a Cs gamma-ray emitter, which produced recoil electrons in the plastic. Secondly, a Polonium source, $^{210}$Po, was used to provide 5.3 MeV alpha particles that entered the surface of the plastic and provided a well defined peak in the prompt pulse height distribution. The time dependence of pulse shapes were compared and shown in FIG. 3. This comparison was made with the subset of data with prompt pulse heights similar to within +−10%.

A factor of ten more light is observed from alpha particles than is observed with gamma-rays at about 180 ns after the event. In this case, the decay constant for the delayed light produced by alpha particles is about 60 ns corresponding to a rate constant, $k_{TT}$, of 1.7 $10^7 (\sec^{-1})$. The decay constant of 60 ns is quite short, compared to the typical decay constant of about 150 ns produced by the base dye, PC, in liquid scintillator. The latter decay constant is fixed by the diffusion limited process that occurs in liquid scintillator. However, a short decay time constant is advantageous for high counting rate operation of a detector using the material composition of embodiments of the invention. The ability to control the decay time constant of the scintillation light used for PSD is a major advantage of the material composition of embodiments of the invention compared to the traditional diffusion limited time constant of organic liquid scintillator.

Figure 4:
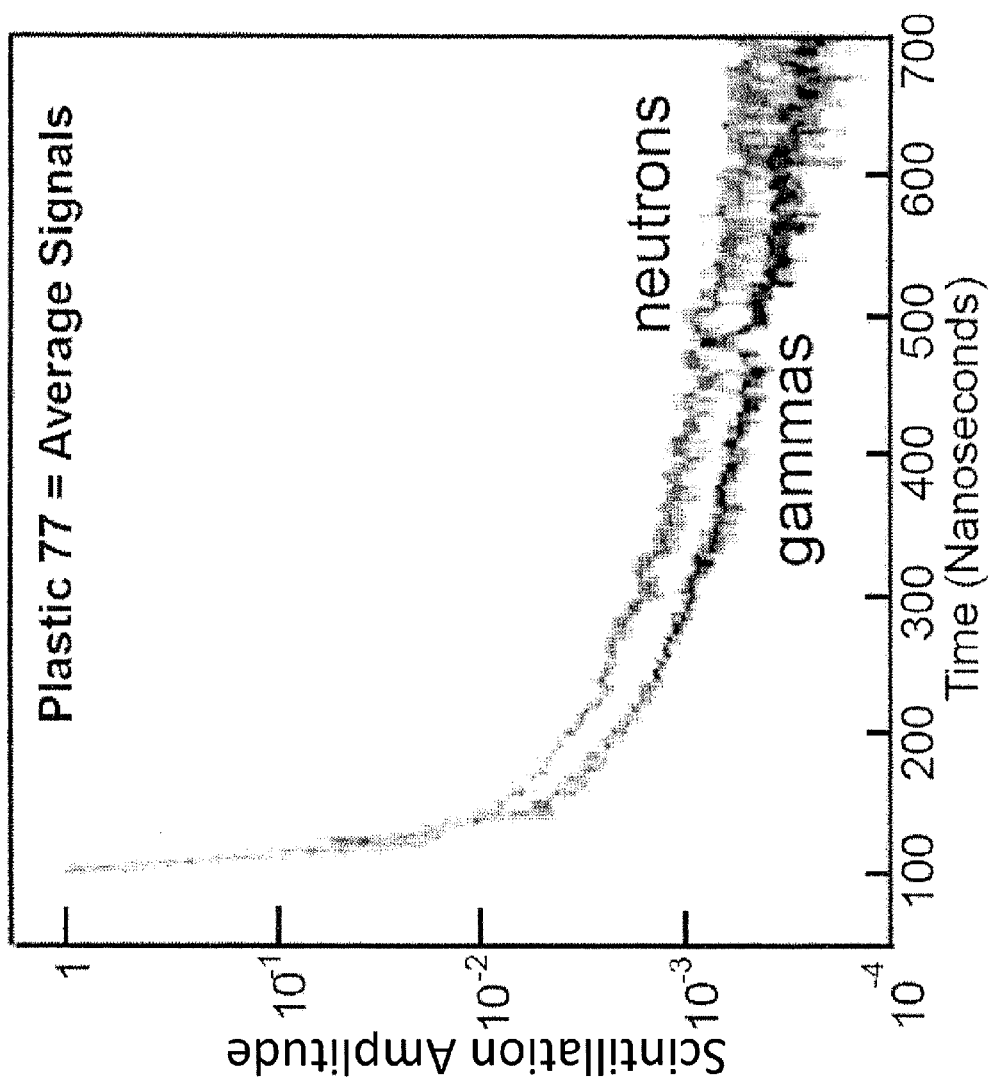
FIG. 4 shows the scintillation pulse height versus time for a PVT plastic scintillator, (Plastic 77), composed of about 0.4 mol/L concentration of the chromophore in isopropylbiphenyl, 0.17 mol/L of pTP and 0.02 mol/L of POPOP, where the scintillation pulse shapes resulting from neutron and gamma ray interactions are clearly distinct and provide some degree of PSD.

The importance of a high enough base dye concentration to achieve efficient PSD is illustrated by the properties of "plastic 77". A polyvinyltoluene plastic scintillator was made to contain about 0.4 mol/L for the chromophore concentration in isopropylbiphenyl, 0.17 mol/L of p-terphenyl and 0.02 mol/L of POPOP (that material was called "plastic 77" by Brooks et al. IRE Trans. Nucl. Sc., NS-7, 35, (1960). Forty years later plastic 77 was reproduced at CEA, Saclay, France and reported in http://slidefinder.net/d/delauney/13688226). "Plastic 77" scintillator displays a PSD as shown in FIG. 4. The shape of the scintillation pulse from neutron scattering can be seen to be well separated from the pulse shape resulting from gamma interactions in the scintillator. It can be seen that in FIG. 4, at 180 nsec after the event, the delayed light intensity has fallen by a factor of about 200, rather than a factor of 20 in FIG. 3, and the separation from the gamma ray curve is about a factor of 2 compared to a factor of 10 in FIG. 3.

Specific embodiments using Pulse Shape Discrimination (PSD) are based on the measured difference in the delayed fluorescent emission from heavily ionizing (neutrons), compared to the delayed fluorescent emission from lightly ionizing (gamma rays) radiation. If $Q_n$ and $Q_\gamma$ are defined as the measured charges produced in a delayed time window, from incident neutrons and incident gamma rays, respectively, it is traditional to define a Figure of Merit (FOM) for a detection system as:

$$FOM = D/(D_n + D_\gamma)$$

Where $$D = Q_n - Q_\gamma$$

And $D_n$ and $D_\gamma$ are the respective full widths at half maximum (FWHM) of the $Q_n$ and $Q_\gamma$ distributions, where $Q_n$ is the measured charge due to incident neutrons, and $Q_\gamma$ is the measured charge due to incident gamma rays. In specific embodiments, values of FOM of at least 1.5, at least 2, at least 3, or in the range 1.5 to 3 indicate that neutrons were incident on the scintillation system, and/or incident on the scintillation composition used in the scintillation system. Such values give gamma rejection ratios are at least 1000:1, and preferably >100,000:1. The scintillation light has a prompt time component having a prompt intensity ($I_P$) and a prompt time constant ($T_P$), and delayed time component having a delayed intensity ($I_D$) and a delayed time constant ($T_D$). In specific embodiments, the materials of the system can be selected such that $I_P$, $T_P$, $I_D$, and $T_D$ are such that a difference between a mean of a gamma ray scintillation signal due to gamma rays incident on the scintillation system and a mean of a neutron scintillation signal due to neutrons incident on the scintillation system divided by a sum of a FWHM of the gamma ray scintillation signal and a FWHM of the neutron scintillation signal is at least 1.5, at least 2, at least 3, in a range 1.5 to 2, and/or in a range 1.5 to 3.

There are other dyes, containing four benzene rings, that are known to exhibit good PSD in the crystalline state, such as tetraphenylbutadiene (LLNL-JRNL-411978 Apr. 8, 2009). This dye has been found to be highly soluble (>0.5 mol/L) in polystyrene (McKinsey D. N. et al. Nucl. Instr. and Methods in Physics Research B, 132 (1997) 351-358) and can be used as a base dye.

In another embodiment of the invention, a single dye is dissolved in the plastic material at low to moderate concentration in the range 0.01-0.1 mol/L. This dye is composed of two or more chromophores. The two or more chromophores are covalently tethered together at a distance from each other of a few Angstroms. The design, synthesis and study of one class of such dyes has been extensively studied (references are given in Benniston A. et al. "Intramolecular Excimer Formation and Delayed Fluorescence in Sterically Constrained Pyrene Dimers", Chem. Eur. J. 2007, 13, 4665-4674). A minimum ionizing recoiling electron has low probability for excitation of two chromophores in a given dye molecule. However, with the one to two orders of magnitude higher ionization density of protons or alpha particles, two or more chromophores in a dye are frequently left in excited singlet or triplet states, and most frequently the chromophores are left in triplet states. Two such triplet states can annihilate and lead to delayed fluorescence in the way described earlier. This type of multi-chromophore dye provides a high local effective concentration of the chromophores. Thus, electronic energy transfer, annihilation, and delayed fluorescence, are much more efficient in this composition than in a composition containing a single chromophore base dye at comparable concentration. In this embodiment of the invention, a high effective chromophore local concentration is achieved with a moderate, or even low, real dye concentration. A benefit is that intermolecular quenching mechanisms are less important because of the moderate dye concentration. Most importantly, variation of the length of the tethers and choice of substituents on the chromophores provide good control of the delayed fluorescence time constant. The distance between the pyrene units can be modulated by steric interactions imposed by bulky moieties attached at the 6, 8-positions of each pyrene unit. Both the quantum yields and decay times for prompt emission have been measured for different Pyrene derivatives and the range of these values is shown in Table 1. The lifetime of delayed fluorescence is in the range 33 to 120 nanoseconds. Most importantly, the quantum yield of delayed excimer fluorescence can be as high as unity. By designing the process to have a relatively small delayed fluorescence lifetime, it minimizes triplet state quenching effects. This ability to control the intensity and lifetime of the delayed fluorescence is a key enabling factor for achieving effective PSD at high counting rates.

In another embodiment, the relative advantages of aromatic and non-aromatic polymers are considered for specific applications. In specific embodiments, highly ionizing particles are identified by the delayed fluorescence resulting from direct excitation followed by triplet-triplet annihilation of a pair of close-by chromophores. The excitation of one or both of these two chromophores can come from an energy transfer from the polymer matrix, such that this type of event can act as a background to the events of interest. Aromatic polymers, such as polystyrene and polyvinyltoluene, can be used and can have a phenyl ring excited by an ionizing particle at any location along the polymer chain. The excited phenyl ring can then transmit energy by the Fluorescence Resonance Energy Transfer (FRET) process along the chain until the energy is absorbed by one of the two chromophores that are close to each other. Thus, the aromatic polymer can act to harvest the energy lost by the ionizing particle in the polymer and transmit it to one or both nearby chromophores. This process can create undesired background events that simulate the direct excitation of two nearby chromophores. For this reason, it can be preferable to employ a non-aromatic, transparent polymer, such as polymethylmethacrylate, to improve the discrimination for neutron detection. It is to be understood that with the use of a non-aromatic polymer, there is less scintillation intensity of prompt and delayed fluorescence. This loss of light intensity leads to larger fluctuation in prompt and delayed pulse heights and a consequent reduction in neutron detection discrimination. These fluctuations are particularly critical at low energies where pulse heights are already low. Accordingly, other than the low neutron energy region, where quantum fluctuations may dominate, a non-aromatic polymer may offer advantages in achieving efficient neutron detection with high discrimination against gamma rays.

FIG. 2 shows the measured time dependence of scintillation pulses from an alpha particle and a gamma-ray interaction in a solid plastic scintillator, with Diisopropyl naphthalene as the base dye. A factor of ten more light is observed from alpha particles than is observed with gamma-rays at about 180 ns after the event. In this case, the decay constant for the delayed light produced by alpha particles is about 60 ns corresponding to a rate constant, $k_{TT}$, of $1.7 \cdot 10^7 (\text{sec}^{-1})$. The decay constant of 60 ns is quite short, compared to the typical decay constant of about 150 ns produced by the base dye, PC, in liquid scintillator (see FIG. 1). However, the short decay constant is advantageous for high counting rate operation of a detector using the material composition of the invention. The ability to control the decay time constant of the scintillation light used for PSD is a major advantage of the material composition of this invention compared to the traditional diffusion limited time constant of organic liquid scintillator.

It is well known that oxygen is a very effective quenching agent of triplet states. The large free volume in a plastic compared to an organic liquid permits a much larger concentration of oxygen in plastic than in solution. For this reason, there is a very large and unacceptable quenching effect by oxygen on the triplet states in plastic. Nevertheless the delayed scintillation signal shown in FIG. 3 demonstrates the survival of some triplet states in polystyrene for at least two hundred nanoseconds. Without oxygen in the plastic, the magnitude of the delayed fluorescence signal would be substantially increased based on similar measurements in solution. It is preferable that a plastic scintillator that is optimized for PSD have little to no oxygen dissolved within the matrix.

In one embodiment, the plastic scintillator has been polymerized in an inert atmosphere.

In one embodiment, the plastic scintillator is placed in a vacuum oven and heated, for example, to between 30 and 70 degrees Celsius, for a period adequate to remove air from the free volume of the material. The required time period is dependent on the dimensions of the material, but a period of a few hours is adequate in many cases. An inert gas is introduced to the heated oven and allowed to diffuse into the plastic over a period of time. Preferentially, the inert gas has a low permeability in the plastic. A preferred gas is nitrogen, which has lower permeability than oxygen in PS.

In another embodiment, the plastic containing an inert gas is coated with a thin layer of plastic or organic material that has a very low permeability for a gas molecule. Examples of such materials are polyvinylidene chloride (PVDC, also known as Saran Wrap) and ethylene vinyl alcohol. New material coatings, no more than a few microns in thickness, have recently become available, such as Nanolok PT ADV 7 from InMat, Inc., which offer a factor of almost 1000 reduction in oxygen permeability compared to PVDC.

In one embodiment, the plastic scintillator material is cross-linked. Cross-linking is desirable to provide improved mechanical and thermal properties to the plastic containing a high concentration of base dye. An additional benefit to cross-linking is to reduce the diffusion coefficient of oxygen in the material by up to one order of magnitude.

In a further embodiment, the plastic scintillator employs several of the above strategies to drastically reduce oxygen quenching of triplets. Using several of the above strategies for achieving minimal oxygen in the polymer, the intensity of delayed fluorescence is expected to be stable for a period of years.

In another embodiment, the concentration of a given type of base dye is selected to achieve a triplet-triplet annihilation rate constant such that the delayed fluorescence time constant is no more than 2 to 10 times the prompt fluorescence time constant. FIG. 1 is used to inform the choice of concentration required to achieve a particular delayed fluorescence lifetime. A relatively short delayed fluorescence lifetime not only reduces the time available for any form of triplet quenching or other forms of triplet loss, but also reduces the random coincidence rate of gamma ray events that simulate neutron signals. The ability of the neutron detecting plastic scintillator to operate in a high radiation field is of particular importance in an Active Interrogation mode to detect Special Nuclear Materials.

In an embodiment, an incident fast neutron in the energy range 0.5 MeV to 4 MeV scatters from a proton in the plastic scintillator, such that the PSD information in the time dependence of the scintillation pulse produced by the recoil proton provides a factor of >1000:1 to discriminate against gamma-rays.

In another embodiment, thermal neutrons can be detected with good discrimination against gamma ray interactions in the detector. Thermal neutrons can interact with, and be "captured" by a few nuclei whose capture cross sections are high. Such nuclei include, but are not limited to, the well known isotopes of lithium ($^6$Li), and boron ($^{10}$B), whose capture products are highly ionizing nuclear fragments. These elements can be introduced in the form of organo-metallic or inorganic metal salt compounds into the scintillating material composition. In the case of boron it is most convenient to dissolve an organo-boron compound into the monomer prior to polymerization. In this way, a $^{10}$B concentration of a few % wt/wt, such as less than 2% wt/wt and such as less than 10% wt/wt, can be achieved. However, the use of $^6$Li is preferred, due to the much higher scintillation pulse height produced by the nuclear fragments (540 keV compared to 90 keV; electron equivalent energy). In the case of $^6$Li, it is preferred to dissolve a polar salt, examples of which include lithium chloride (LiCl) and lithium nitrate (LiNO$_3$), into the monomer prior to polymerization.

In one embodiment, the salt was dissolved directly into the monomer, styrene. A typical maximum concentration of Li ions dissolved in the monomer was found to be about 0.1% wt/wt.

In another embodiment, the salt was dissolved into a highly polar solvent, such as N-Methyl Pyrrolidone (NMP), Dimethyl 2-imidazolidone (DMI) or Dimethyl Sulfoxide (DMSO), and the solution was then added to the monomer. For a fixed polar solvent concentration of 15% wt/wt in the monomer, up to about 0.07% wt/wt of Li ions in the final monomer solution was achieved. Diisopropyl naphthalene was found to be miscible at 15% wt/wt in the solution and acted as the base dye. PPO, and bis MSB, were dissolved in the final solution at 1%, and 0.02% wt/wt, respectively. An initiator, AIBN, was added to the solution at a concentration of 0.5% wt/wt and the temperature was raised to 60° C. for 48 hours and a brightly scintillating transparent polymer was produced. The glass transition temperature of the polymer was found to be about 40° C. The scintillating light output was measured to be about 30% of that from anthracene.

In a further embodiment, the salt was dissolved into a highly polar monomer, such as N-vinyl Pyrrolidone (NVP) and the above base, primary and secondary dyes were also added. Similar to the above solution, a fixed concentration of the polar co-monomer concentration of 15% wt/wt was added to the styrene monomer and permitted up to about 0.06% wt/wt of Li ions in the solution. Polymerization resulted in a highly transparent scintillating copolymer with glass transition temperature of about 60° C.

In an embodiment, when enriched $^6$Li is used to synthesize the salt, it is possible to achieve a thermal neutron "mean free path" of about 18 cm in the plastic scintillator. Because a thermal neutron diffuses randomly in the plastic scintillator, an intrinsic detection efficiency of more than 40% can be achieved in 3 inch thick material.

In an embodiment, the material composition of the plastic scintillator provides comparable interaction mean free paths for fast neutron scattering and thermal neutron capture.

In an embodiment, the products of neutron capture by $^6$Li are alpha particles and tritons, which have more than 10 times greater ionizing intensity per unit length along their track than recoil protons produced by neutron scatters. A large density of triplets is produced along the tracks of the particles. Efficient triplet-triplet annihilation occurs and the ratio of delayed to prompt fluorescence intensity is measurably greater than produced in the case of recoil protons from neutron scattering. The neutron capture process produces:

1) An initial prompt scintillation signal with unique pulse height (at about 540 keV electron equivalent energy) and fast decay time, and
2) A fairly intense and longer lifetime scintillation signal.

In an embodiment, the combination of these unique pulse shape characteristics are measured in-line by a high bandwidth waveform digitizer. The data is sent to a processor and analyzed on-line with algorithms to provide optimum discrimination against gamma ray interaction in the scintillating material composition. The results from the data analysis permit distinguishing a neutron capture process in the material from a gamma ray interaction, with a gamma rejection ratio of greater than 100,000 to 1. The thermal neutron detection efficiency can be more than 40% in a three inch thick plastic scintillator having one of the compositions described in the subject application.

In another embodiment, neutron spectroscopy is performed. A detector system employs a material composition described in the subject application, and detects, identifies, and measures the total kinetic energy of fast neutrons. In this way, the detector measures the spectral distribution of the neutrons, providing information on the type of fissile material forming the source. When a 1 to 4 MeV neutron is incident on the detector system, the fast neutron scatters sequentially from several protons (within a time interval of less than about 10 ns) until 90% of the total energy of the neutron has transferred to protons. The discrimination against gamma ray events is typically, at least 10,000 to 1 for these multiple scattering events. The neutron has been slowed to near thermal energy. The integrated prompt plus delayed scintillation pulse height resulting from several proton recoils is measured as described above, and is related to the total neutron energy. Successive incident neutrons are measured in this way, and the spectrum of neutron energies is deduced from these measurements.

In another embodiment, a detector system is constructed using a material composition described in the subject application that measures the recoil energies from scattering of fast neutrons, and records the subsequent capture event. The characteristic time between these two events is called the capture time and is a result of the thermalization process. That time depends on the Li ion concentration, but is about 20 microseconds for the 0.06% wt/wt in the material. The gamma discrimination of the two types of interactions is independent. As a result, this type of detector system provides very high gamma ray background rejection of at least 1,000,000 to one, and is referred to as operating in the "Capture Gated" mode. The capture time is relatively short because of the integrated functions of scatter and capture in the same material, this type of detection system has the characteristic of high counting rate, high gamma discrimination and high detection sensitivity.

In general, a "capture gated" event is unambiguous evidence for neutron detection. Only fissile material, referred to as Special Nuclear Material (SNM), releases neutrons naturally. The material composition of the plastic scintillator offers the possibility of constructing large area, segmented neutron detectors for the detection of multiple correlated neutrons from fission events. These events may be from passive fission, or stimulated fission by a beam of gamma rays or neutron radiation incident on a container. The latter process is referred to as "Active Interrogation". In Active Interrogation, using a gamma or neutron beam, there is a high background of gamma rays that must be discriminated against. This type of detector system can be effectively used to measure the presence of SNM by Active Interrogation. This type of detector has the necessary properties to operate in conjunction with active interrogation to find the most challenging fissile material, namely enriched uranium In another embodiment, a neutron can be detected in one of the embodiments described above. That event can be delayed electronically, and a gate can be opened prior to the neutron event to detect the presence of a time correlated gamma-ray arriving at the detector prior to the neutron. Time correlations between neutrons and gamma-rays are an additional powerful signature of the presence of fissile material.

In another embodiment, a neutron can be detected in one of the embodiments described above. That event can open an electronic gate, extending 5, 10, or 15 microseconds prior to, and 5, 10, or 15 microseconds after the neutron event, to detect the presence of a time correlated neutron arriving at the detector. Time correlations between two or more neutrons are an additional powerful signature of the presence of fissile material.

Embodiments

Embodiment 1. A scintillation system for detecting incident radiation, comprising:

a scintillator composition for converting incident radiation to scintillation light wherein the scintillator composition comprises:

a matrix material with a plurality of base fluorescent dye molecules dissolved therein, wherein the matrix material is a solid organic material, wherein the matrix material with the plurality of base fluorescent dye molecules dissolved therein comprises a plurality of chromophores, wherein the plurality of chromophores have a chromophore average nearest neighbor distance in the range 0.5 to 12 Angstroms;

wherein the plurality of chromophores produces the scintillation light upon excitation;

wherein the scintillation light has a prompt time component and a delayed time component, wherein the prompt time component and the delayed time component provide information so as to allow distinguishing between scintillation light created by neutrons and scintillation light created by gamma rays.

Embodiment 2. The scintillation system according to Embodiment 1, wherein the plurality of base fluorescent dye molecules comprises a plurality of base fluorescent dye chromophores, wherein each base fluorescent dye molecule comprise one or more base fluorescent dye chromophores of the plurality of base fluorescent dye chromophores, wherein the plurality of chromophores comprises the plurality of base fluorescent dye chromophores, wherein the plurality of base fluorescent dye chromophores have a base fluorescent dye chromophore average nearest neighbor distance in the range 0.5 to 12 Angstroms.

Embodiment 3. The scintillation system according to Embodiment 1, wherein the plurality of chromophores comprises a plurality of matrix material chromophores, wherein the matrix material chromophores have a matrix material chromophore average nearest neighbor distance in the range 0.5 to 12 Angstroms.

Embodiment 4. The scintillation system of Embodiment 1, wherein the prompt time component has a prompt intensity ($I_P$) and a prompt time constant ($T_P$), and the delayed time component has a delayed intensity ($I_D$) and a delayed time constant ($T_D$).

Embodiment 5. The scintillation system according to Embodiment 4, wherein $I_P$, $T_P$, $I_D$, and $T_D$ are such that a difference between a mean of a gamma ray scintillation signal due to gamma rays incident on the scintillation system and a mean of a neutron scintillation signal due to neutrons incident on the scintillation system divided by a sum of a FWHM of the gamma ray scintillation signal and a FWHM of the neutron scintillation signal is at least 2.

Embodiment 6. The scintillation system according to Embodiment 5, wherein the difference divide by the sum is at least 3.

Embodiment 7. The scintillation system of Embodiment 1, further comprising a receiver, wherein the receiver records and analyzes the scintillation light from the scintillator composition and determines whether neutrons were incident on the scintillation system.

Embodiment 8. The scintillation system of Embodiment 1, wherein the matrix material is a polymeric material.

Embodiment 9. The scintillation system according to Embodiment 8, wherein the matrix material is transparent to the scintillation light.

Embodiment 10. The scintillation system of Embodiment 2, wherein the matrix material comprises one or more materials selected from the group consisting of: polystyrene, polyvinyltoluene, polyvinylxylene, polyvinylnaphthalene, polyvinylbiphenyl, polyvinylcarbazole, polycarbonate, polyvinylcarbonate, N-vinyl Pyrrolidone, and polymethylmethacrylate.

Embodiment 11. The scintillation system of Embodiment 1, wherein the matrix material is a cross-linked polymeric material.

Embodiment 12. The scintillation system of Embodiment 2, wherein the plurality of base fluorescent dye molecules has a concentration in the range 0.3 to 3.5 mol/L.

Embodiment 13. The scintillation system of Embodiment 2, wherein the plurality of base fluorescent dye molecules has a concentration in the range 0.5 to 1.5 mol/L.

Embodiment 14. The scintillation system of Embodiment 2, wherein a first excited singlet state of one of the plurality of base fluorescent dye chromophores has a quantum yield >0.25.

Embodiment 15. The scintillation system of Embodiment 2, wherein a first excited singlet state of one of the plurality of base fluorescent dye chromophores has a quantum yield >0.5

Embodiment 16. The scintillation system of Embodiment 2, wherein a first excited singlet state of one of the plurality of base fluorescent dye chromophores has a quantum yield >0.75.

Embodiment 17. The scintillation system of Embodiment 2, wherein a first excited triplet state of one of the plurality of base fluorescent dye chromophores has an annihilation rate with the first excited triplet state of its nearest neighbor that is determined by a concentration of the plurality of base fluorescent dye molecules.

Embodiment 18. The scintillation system of Embodiment 2, wherein the plurality of base fluorescent dye molecules comprises a polycyclic aromatic dye.

Embodiment 19. The scintillation system of Embodiment 1, wherein the plurality of base fluorescent dye molecules comprises one or more dyes selected from the group consisting of: pyrene and fluoranthene, and derivatives thereof.

Embodiment 20. The scintillation system of Embodiment 1, wherein the plurality of base fluorescent dye molecules comprises one or more dyes selected from the group of single ring benzene compounds consisting of pseudocumene, xylene, benzene and all derivatives thereof.

Embodiment 21. The scintillation system of Embodiment 1, wherein the plurality of base fluorescent dye molecules comprises one or more dyes selected from a group consisting of: a chromophore class known as naphthalene and a chromophore class known as biphenyl, and derivatives thereof.

Embodiment 22. The scintillation system of Embodiment 1, wherein the plurality of base fluorescent dye molecules comprises fluorene dibenzofuran and carbazole.

Embodiment 23. The scintillation system of Embodiment 1, wherein the at least one dye comprises one or more dyes selected from a group consisting of: a chromophore class known as para-configured three ring compounds and their derivatives such as P-TerPhenyl (PTP), DiPhenylOxalole (PPO) and DiPhenylFuran (PPF).

Embodiment 24. The scintillation system of Embodiment 2, wherein each base fluorescent dye molecule of the plurality of base fluorescent dye molecules comprises two or more chromophores.

Embodiment 25. The scintillation system of Embodiment 24, wherein the two or more chromophores are constrained by a molecular structure of the base fluorescent base dye molecule to have an inter-chromophore distance in the range 1 to 12 Angstroms.

Embodiment 26. The scintillation system of Embodiment 24, wherein a concentration of the plurality of base fluorescent dye molecules is in a range of 0.005 to 0.5 mol/L.

Embodiment 27. The scintillation system of Embodiment 24, wherein a first excited singlet state of each of the two or more chromophores has a quantum yield >0.25

Embodiment 28. The scintillation system of Embodiment 1, further comprising a plurality of primary fluorescent dye molecules dissolved in the matrix materials, wherein the plurality of primary fluorescent dye molecules has a concentration in the range of 0.0005 to 0.005 mol/L in the matrix material, wherein the plurality of primary fluorescent dye molecules shift a peak of a scintillation light spectrum to a wavelength greater than 460 nm.

Embodiment 29. The scintillation system of Embodiment 1, further comprising a plurality of primary fluorescent dye molecules dissolved in the matrix material, wherein the plurality of primary fluorescent dye molecules has a concentration of 0.05 to 0.1 mol/L, wherein the plurality of primary fluorescent dye molecules non-radiatively receives energy from the plurality of base fluorescent dye molecules, wherein the plurality of primary dye molecules fluoresces light that is absorbed by a plurality of secondary dye molecules dissolved in the matrix material, wherein the plurality of secondary dye molecules shifts a peak of a scintillation light spectrum to a wavelength greater than 500 nm.

Embodiment 30. The scintillation system of Embodiment 29, wherein the plurality of primary fluorescent dye molecules comprises one or more dyes selected from the group consisting of: PTP, PPO and PPF.

Embodiment 31. The scintillation system of Embodiment 29, wherein the plurality of secondary fluorescent dye molecules comprises one or more dyes selected from the group consisting of: a coumarin dye and a rhodamine dye.

Embodiment 32. The scintillation system of Embodiment 1, wherein a scintillation intensity of the scintillation light is not significantly affected by high integrated radiation levels.

Embodiment 33. The scintillation system of Embodiment 1, wherein the scintillation system provides information sufficient to discriminate between an electron recoil from a scattered gamma ray, a recoil proton from a scattered neutron, and nuclear fragments from the capture of a neutron by a nucleus.

Embodiment 34. The scintillation system of Embodiment 2, wherein the polymeric material is a non-aromatic polymeric material.

Embodiment 35. The scintillation system of Embodiment 34, wherein the polymeric material is polymethylmethacrylate.

Embodiment 36. The scintillation system of Embodiment 1, wherein the matrix material has less than $10^{-4}$ wt/wt of oxygen dissolved therein.

Embodiment 37. The scintillation system of Embodiment 1, wherein the matrix material has less than $10^{-5}$ wt/wt of oxygen dissolved therein.

Embodiment 38. The scintillation system of Embodiment 2, wherein the base fluorescent dye chromophore average nearest neighbor distance between is such that a delayed fluorescence lifetime of the plurality of base fluorescent dye molecules that is in the range of 2 to 100 times that of a prompt fluorescence lifetime of the plurality of base fluorescent dye molecules.

Embodiment 39. The scintillation system of Embodiment 1, wherein a fast neutron scatters from a proton and can be discriminated from an incident gamma-ray with a factor of at least 1000:1.

Embodiment 40. The scintillation system of Embodiment 1, wherein an energy spectrum of fast neutrons can be determined from a distribution of energy depositions of incident fast neutrons.

Embodiment 41. The scintillation system of Embodiment 2, wherein an organo-metallic compound or metallic salt compound is dissolved in a monomer and the solution is polymerized to produce the polymeric material.

Embodiment 42. The scintillation system of Embodiment 2, wherein an organo-metallic compound or metallic salt compound is dissolved in a polar solvent or monomer that is subsequently incorporated within the transparent polymer.

Embodiment 43. The scintillation system of Embodiment 42, wherein the organo-metallic compound or metallic salt compound comprises one or more isotopes selected from the group consisting of: lithium isotopes, boron isotopes, and gadolinium isotopes, wherein a concentration of metal ions is at least 0.04% wt/wt, and preferably at least 0.06%, and most preferably at least 0.08% wt/wt of metal ions.

Embodiment 44. The scintillation system of Embodiment 43, wherein the concentration of the metal ions is at least 0.06% wt/wt.

Embodiment 45. The scintillation system of Embodiment 43, wherein the concentration of the metal ions is at least 0.08% wt/wt.

Embodiment 46. The scintillation system of Embodiment 42, wherein thermal neutrons can be detected and discriminated from gamma-rays with a factor of at least 100,000:1.

Embodiment 47. The scintillation system of Embodiment 1, wherein fast neutrons can be detected using a capture-gated mode with a gamma discrimination of at least 1,000,000:1.

Embodiment 48. The scintillation system of Embodiment 1, wherein passive detection of Special Nuclear Material (SNM) is accomplished by detecting fast or thermal neutrons produced by SNM.

Embodiment 49. The scintillation system of Embodiment 1, wherein active detection of SNM is accomplished by detecting fast or thermal neutrons.

Embodiment 50. The scintillation system of Embodiment 1, wherein a segmented form of the matrix material with the plurality of base fluorescent dye molecules permits detection of two or more time correlated neutrons.

Embodiment 51. The scintillation system of Embodiment 1, wherein a segmented form of the matrix material with the plurality of base fluorescent dye molecules permits detection of one or more neutrons and one or more time correlated gamma-rays.

Embodiment 52. The scintillation system of Embodiment 1, wherein the scintillator composition comprises, a dissolved metal.

Embodiment 53. The scintillation system of Embodiment 7, wherein the receiver comprises a photo-electric system.

Embodiment 54. The scintillation system of Embodiment 7, wherein the receiver comprises one or more photosensitive detectors whose electrical outputs are processed to provide digital signals characteristic of time dependent scintillation light pulse shapes of the scintillation light.

Embodiment 55. The scintillation system of Embodiment 54, wherein the receiver further comprises one or more microprocessors, wherein the one or more microprocessors receive the electrical outputs of the photosensitive detectors, wherein the one or more microprocessors employ algorithms to improve discrimination and detection efficiency of gamma rays, neutron scatters, and neutron capture in the matrix material.

Embodiment 56. The scintillation system of Embodiment 1, wherein the chromophore average nearest neighbor distance is in the range 1 to 8 Angstroms.

Embodiment 57. The scintillation system of Embodiment 2, wherein the base fluorescent dye chromophore average nearest neighbor distance is in the range 1 to 8 Angstroms.

Embodiment 58. A method for detecting incident radiation, comprising:
positioning a scintillation system in a region of interest, wherein the scintillation system comprises:
  a scintillator composition for converting the incident radiation to scintillation light wherein the scintillator composition comprises:
  a matrix material, wherein the matrix material is a solid organic material, wherein the matrix material comprises chromophores, wherein the chromophores have an average nearest neighbor distance in the range of 0.5 to 12 Angstroms;
  wherein the chromophores produce the scintillation light upon excitation;
  wherein the prompt time component and the delayed time component provide information so as to allow distinguishing between scintillation light created by neutrons and scintillation light created by gamma rays;
  receiving the scintillation light; and
  determining form the received scintillation light whether neutrons were incident on the scintillation system.

Embodiment 59. The method according to Embodiment 58 wherein the plurality of base fluorescent dye molecules comprises a plurality of base fluorescent dye chromophores, wherein each base fluorescent dye molecule comprises one or more base fluorescent dye chromophores of the plurality of base fluorescent dye chromophores, wherein the plurality of chromophores comprises the plurality of base fluorescent dye chromophores, wherein the plurality of base fluorescent dye chromophores have a base fluorescent dye chromophore average nearest neighbor distance in the range 0.5 to 12 Angstroms.

Embodiment 60. The method according to Embodiment 58, wherein the chromophore average nearest neighbor distance is in the range 1 to 8 Angstroms.

Embodiment 61. The method according to Embodiment 59, wherein the base fluorescent dye chromophore average nearest neighbor distance is in the range 1 to 8 Angstroms.

Embodiment 62. The method according to Embodiment 58, wherein the plurality of chromophores comprises a plurality of matrix material chromophores, wherein the matrix material chromophores have a matrix material chromophore average nearest neighbor distance in the range 0.5 to 12 Angstroms.

Embodiment 63. A scintillator composition for converting the incident radiation to scintillation light, comprising:
a matrix material with a plurality of base fluorescent dye molecules dissolved therein, wherein the matrix material is a solid organic material, wherein the matrix material with the plurality of base fluorescent dye molecules dissolved therein comprises a plurality of chromophores, wherein the plurality of chromophores have a chromophore average nearest neighbor distance in the range 0.5 to 12 Angstroms;
wherein the plurality of chromophores produces the scintillation light upon excitation;
wherein the scintillation light has a prompt time component and a delayed time component, wherein the prompt time component and the delayed time component provide information so as to allow distinguishing between scintillation light created by neutrons and scintillation light created by gamma rays.

Embodiment 64. The scintillation composition according to Embodiment 63, wherein the plurality of base fluorescent dye molecules comprises a plurality of base fluorescent dye chromophores, wherein each base fluorescent dye molecules comprises one or more base fluorescent dye chromophores of the plurality of base fluorescent dye chromophores, wherein the plurality of chromophores comprises the plurality of base fluorescent dye chromophores, wherein the plurality of base fluorescent dye chromophores have a base fluorescent dye chromophore average nearest neighbor distance in the range 0.5 to 12 Angstroms.

Embodiment 65. The scintillation composition according to Embodiment 63, wherein the plurality of chromophores comprises a plurality of matrix material chromophores, wherein the matrix material chromophores have a matrix material chromophore average nearest neighbor distance in the range 0.5 to 12 Angstroms.

Embodiment 66. The scintillation composition according to Embodiment 63, wherein the chromophore average nearest neighbor distance is in the range 1 to 8 Angstroms.

Embodiment 67. The scintillation composition according to Embodiment 64, wherein the base fluorescent dye chromophore average nearest neighbor distance is in the range 1 to 8 Angstroms.

We claim:
1. A scintillation system for detecting incident radiation, comprising:

a scintillator composition for converting incident radiation including gamma rays and/or neutrons to scintillation light,
wherein the scintillator composition comprises:
a matrix material with a plurality of base fluorescent dye molecules dissolved therein,
wherein the matrix material is a solid organic material,
wherein the matrix material is a polymeric material,
wherein the matrix material is transparent to the scintillation light,
wherein the matrix material with the plurality of base fluorescent dye molecules dissolved therein comprises a plurality of fluorescent chromophores,
wherein the plurality of fluorescent chromophores have a chromophore average nearest neighbor distance in the range 0.5 to 12 Angstroms;
wherein the plurality of fluorescent chromophores produces the scintillation light upon excitation by incident radiation including gamma rays and/or neutrons;
wherein the scintillation light has a prompt time component and a delayed time component, and
wherein the prompt time component and the delayed time component provide information so as to allow distinguishing between scintillation light created by neutrons and scintillation light created by gamma rays.

2. The scintillation system according to claim 1,
wherein the plurality of base fluorescent dye molecules comprises a plurality of base fluorescent dye chromophores,
wherein each base fluorescent dye molecule comprise one or more base fluorescent dye chromophores of the plurality of base fluorescent dye chromophores,
wherein the plurality of fluorescent chromophores comprises the plurality of base fluorescent dye chromophores, and
wherein the plurality of base fluorescent dye chromophores have a base fluorescent dye chromophore average nearest neighbor distance in the range 0.5 to 12 Angstroms.

3. The scintillation system of claim 2,
wherein the matrix material comprises one or more materials selected from the group consisting of:
polystyrene, polyvinyltoluene, polyvinylxylene, polyvinylnaphthalene, polyvinylbiphenyl, polyvinylcarbazole, polycarbonate, polyvinylcarbonate, N-vinyl Pyrrolidone, and polymethylmethacrylate.

4. The scintillation system of claim 2,
wherein the plurality of base fluorescent dye molecules has a concentration in the range 0.3 to 3.5 mol/L.

5. The scintillation system of claim 2,
wherein the plurality of base fluorescent dye molecules has a concentration in the range 0.5 to 1.5 mol/L.

6. The scintillation system of claim 2,
wherein a first excited singlet state of one of the plurality of base fluorescent dye chromophores has a quantum yield >0.25.

7. The scintillation system of claim 2,
wherein a first excited singlet state of one of the plurality of base fluorescent dye chromophores has a quantum yield >0.5.

8. The scintillation system of claim 2,
wherein a first excited singlet state of one of the plurality of base fluorescent dye chromophores has a quantum yield >0.75.

9. The scintillation system of claim 2,
wherein a first excited triplet state of one of the plurality of base fluorescent dye chromophores has an annihilation rate with the first excited triplet state of its nearest neighbor that is determined by a concentration of the plurality of base fluorescent dye molecules.

10. The scintillation system of claim 2,
wherein the plurality of base fluorescent dye molecules comprises a polycyclic aromatic dye.

11. The scintillation system according to claim 1,
wherein the plurality of fluorescent chromophores comprises a plurality of matrix material fluorescent chromophores, and
wherein the matrix material fluorescent chromophores have a matrix material fluorescent chromophore average nearest neighbor distance in the range 0.5 to 12 Angstroms.

12. The scintillation system of claim 1,
wherein the prompt time component has a prompt intensity ($I_P$) and a prompt time constant ($T_P$), and the delayed time component has a delayed intensity ($I_D$) and a delayed time constant ($T_D$).

13. The scintillation system according to claim 12,
wherein $I_P$, $T_P$, $I_D$, and $T_D$ are such that a difference between a mean of a gamma ray scintillation signal due to gamma rays incident on the scintillation system and a mean of a neutron scintillation signal due to neutrons incident on the scintillation system divided by a sum of a FWHM of the gamma ray scintillation signal and a FWHM of the neutron scintillation signal is at least 2.

14. The scintillation system according to claim 13,
wherein the difference divide by the sum is at least 3.

15. The scintillation system of claim 1, further comprising:
a receiver,
wherein the receiver records and analyzes the scintillation light from the scintillator composition and determines whether neutrons were incident on the scintillation system.

16. The scintillation system of claim 1,
wherein the matrix material is a cross-linked polymeric material.

17. A method for detecting incident radiation, comprising:
positioning a scintillation system in a region of interest,
wherein the scintillation system comprises:
a scintillator composition for converting the incident radiation including gamma rays and/or neutrons to scintillation light,
wherein the scintillator composition comprises:
a matrix material with a plurality of base fluorescent dye molecules dissolved therein,
wherein the matrix material is a solid organic material,
wherein the matrix material is a polymeric material,
wherein the matrix material is transparent to the scintillation light,
wherein the matrix material comprises fluorescent chromophores,
wherein the fluorescent chromophores have an average nearest neighbor distance in the range of 0.5 to 12 Angstroms;
wherein the fluorescent chromophores produce the scintillation light upon excitation by incident radiation including gamma rays and/or neutrons;
wherein the scintillation light has a prompt time component and a delayed time component,
wherein the prompt time component and the delayed time component provide information so as to allow distinguishing between scintillation light created by neutrons and scintillation light created by gamma rays;

receiving the scintillation light; and
determining from the received scintillation light whether neutrons were incident on the scintillation system.

18. The method according to claim 17,
wherein the plurality of base fluorescent dye molecules comprises a plurality of base fluorescent dye chromophores,
wherein each base fluorescent dye molecule comprise one or more base fluorescent dye chromophores of the plurality of base fluorescent dye chromophores,
wherein the plurality of fluorescent chromophores comprises the plurality of base fluorescent dye chromophores, and
wherein the plurality of base fluorescent dye chromophores have a base fluorescent dye chromophore average nearest neighbor distance in the range 0.5 to 12 Angstroms.

19. A scintillator composition for converting the incident radiation to scintillation light, comprising:
a matrix material with a plurality of base fluorescent dye molecules dissolved therein,
wherein the matrix material is a solid organic material,
wherein the matrix material is a polymeric material,
wherein the matrix material is transparent to the scintillation light,
wherein the matrix material with the plurality of base fluorescent dye molecules dissolved therein comprises a plurality of fluorescent chromophores,
wherein the plurality of fluorescent chromophores have a fluorescent chromophore average nearest neighbor distance in the range 0.5 to 12 Angstroms;
wherein the plurality of fluorescent chromophores produces the scintillation light upon excitation by incident radiation including gamma rays and/or neutrons;
wherein the scintillation light has a prompt time component and a delayed time component, and
wherein the prompt time component and the delayed time component provide information so as to allow distinguishing between scintillation light created by neutrons and scintillation light created by gamma rays.

20. The scintillator composition according to claim 19,
wherein the plurality of base fluorescent dye molecules comprises a plurality of base fluorescent dye chromophores,
wherein each base fluorescent dye molecule comprise one or more base fluorescent dye chromophores of the plurality of base fluorescent dye chromophores,
wherein the plurality of fluorescent chromophores comprises the plurality of base fluorescent dye chromophores, and
wherein the plurality of base fluorescent dye chromophores have a base fluorescent dye chromophore average nearest neighbor distance in the range 0.5 to 12 Angstroms.

* * * * *

UNITED STATES PATENT AND TRADEMARK OFFICE
CERTIFICATE OF CORRECTION

PATENT NO. : 9,897,706 B2
APPLICATION NO. : 14/674795
DATED : February 20, 2018
INVENTOR(S) : James K. Walker, Richard T. Farley and Youngwook Noh It is certified that error appears in the above-identified patent and that said Letters Patent is hereby corrected as shown below:

In the Specification

Column 7,
Line 13, "V. L. Soy." should read --V. L. Sov.--.

Column 9,
Line 67, "*Polyrene" should read --*Polystyrene--.
Line 67, "Polyvinyftoluene" should read --Polyvinyltoluene--.

Signed and Sealed this
Twenty-ninth Day of January, 2019

Andrei Iancu
*Director of the United States Patent and Trademark Office*